United States Patent
Abe et al.

(10) Patent No.: US 8,929,015 B2
(45) Date of Patent: Jan. 6, 2015

(54) DATA WRITING METHOD AND PROGRAM FOR TAPE DRIVE

(71) Applicant: International Business Machines Corporation, Armonk, NY (US)

(72) Inventors: Atsushi Abe, Tokyo (JP); Takashi Ashida, Tokyo (JP); Setsuko Masuda, Tokyo (JP); Yutaka Oishi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/249,893

(22) Filed: Apr. 10, 2014

(65) Prior Publication Data
US 2014/0313609 A1    Oct. 23, 2014

(30) Foreign Application Priority Data
Apr. 23, 2013 (JP) .................................. 2013-090230

(51) Int. Cl.
  *G11B 5/09*   (2006.01)
  *G11B 20/14*  (2006.01)
  *G06F 3/06*   (2006.01)

(52) U.S. Cl.
  CPC .............. *G11B 20/14* (2013.01); *G06F 3/0682* (2013.01); *G06F 3/0656* (2013.01); *G06F 3/0611* (2013.01)
  USPC ........................................................ 360/51

(58) Field of Classification Search
  None
  See application file for complete search history.

(56) References Cited

U.S. PATENT DOCUMENTS 5,892,633 A * 4/1999 Ayres et al. ................. 360/73.08
8,316,162 B2 11/2012 Katagiri et al.

FOREIGN PATENT DOCUMENTS

| EP | 535779 A1 | * | 4/1993 | ............. G11B 5/08 |
| EP | 708444 A1 | * | 4/1996 | ............. G11B 23/18 |
| JP | 03248358 A | * | 11/1991 | ............. G11B 15/02 |
| JP | 05174311 A | * | 7/1993 | ............. G11B 5/27 |
| JP | 2010113739 | | 5/2010 | |

OTHER PUBLICATIONS

English machine translation of JP 05174311 (Yamashita et al., Magnetic Tape Device With Automatic Reverse Mechanism, published Jul. 1993).*

* cited by examiner

*Primary Examiner* — Wayne Young
*Assistant Examiner* — Mark Fischer
(74) *Attorney, Agent, or Firm* — Zilka-Kotab, PC

(57) ABSTRACT

One embodiment includes a method for writing data to a tape in a tape drive while data successively accumulated in the buffer of a file system is transferred to the tape drive. The method includes detecting a wrap turn when data is being written to the tape; allocating buffer space including a storage capacity exceeding the amount of data to be stored in the buffer during the wrap turn; successively accumulating write data in the buffer space instead of the buffer during the wrap turn; resuming the accumulation of write data in the buffer after the wrap turn has been completed; and releasing the buffer space after the write data accumulated in the buffer space has been transferred to the tape drive.

15 Claims, 3 Drawing Sheets

DATA WRITING METHOD AND PROGRAM FOR TAPE DRIVE

RELATED APPLICATIONS

This application claims priority to Japan Patent Application No. 2013-090230, filed Apr. 23. 2013, which is herein incorporated by reference.

BACKGROUND

The present invention relates to the writing of data to a tape drive and, more specifically, to a method for writing data to a tape in a tape drive used in a file system.

Tape drives can be used in file systems similar to hard disk drives (HDD). Tape drives compatible with LTO standards (LTO-5 or later) can be used in file systems. The tape used in LTO-compatible tape drives has a plurality of wraps (for example, 80). When data is written to such a tape and the writing of data to a single wrap has been completed, a so-called "wrap turn" operation is required to reverse the traveling direction of the tape and move to write data to the next wrap.

One type of file system is a Linear Tape File System (LTFS). Because data is written continuously to a tape drive in LTFS, a so-called delayed write function is required to write data to the tape while data accumulated in the buffer is successively transferred to the tape drive.

Because a LTFS tape drive with a delayed write function cannot write data to a tape during the seconds required to perform the wrap turn operation, the write data during this period simply accumulates in the buffer. Often, the buffer runs out of free space and the accumulation of data in the buffer is interrupted. Because an LTFS buffer is shared with other peripherals in addition to the host, there is a chance that data accumulation will be interrupted at each wrap turn. As a result, problems occur related to delays in writing data to LTFS tape drives.

Increasing the storage capacity of buffers has been considered as a way of preventing interruptions in the accumulation of data in buffers. However, regularly releasing a large amount of storage capacity for the LTFS is undesirable as the LTFS then monopolizes the resources of the host using the LTFS. Because LTFS is reconciled with other applications, its use of buffer capacity should be minimized in order to avoid data writing delays caused by wrap turns.

BRIEF SUMMARY

One embodiment includes a method for writing data to a tape in a tape drive while data successively accumulated in the buffer of a file system is transferred to the tape drive. The method includes detecting a wrap turn when data is being written to the tape, allocating buffer space including a storage capacity exceeding the amount of data to be stored in the buffer during the wrap turn, successively accumulating write data in the buffer space instead of the buffer during the wrap turn, resuming the accumulation of write data in the buffer after the wrap turn has been completed, and releasing the buffer space after the write data accumulated in the buffer space has been transferred to the tape drive.

Another embodiment includes a computer program product for writing data to a tape in a tape drive while data successively accumulated in the buffer of a file system is transferred to the tape drive. Moreover, the computer program product includes a computer readable storage medium having program instructions embodied therewith, the program instructions readable and/or executable by a device to cause the device to perform a method which includes detecting a wrap turn when data is being written to the tape, allocating buffer space including a storage capacity exceeding the amount of data to be stored in the buffer during the wrap turn, successively accumulating write data in the buffer space instead of the buffer during the wrap turn, resuming the accumulation of write data in the buffer after the wrap turn has been completed, and releasing the buffer space after the write data accumulated in the buffer space has been transferred to the tape chive.

Yet another embodiment includes a system for writing data to a tape in a tape drive while data successively accumulated in the buffer of a file system is transferred to the tape drive. Furthermore, this method includes a processor and logic integrated with and/or executable by the processor, the logic being configured to: detect a wrap turn when data is being written to the tape, allocate buffer space including a storage capacity exceeding the amount of data to be stored in the buffer during the wrap turn, successively accumulate write data in the buffer space instead of the buffer during the wrap turn, resume the accumulation of write, data in the buffer after the wrap turn has been completed, and release the buffer space after the write data accumulated in the buffer space has been transferred to the tape drive.

DETAILED DESCRIPTION

Figure 1:
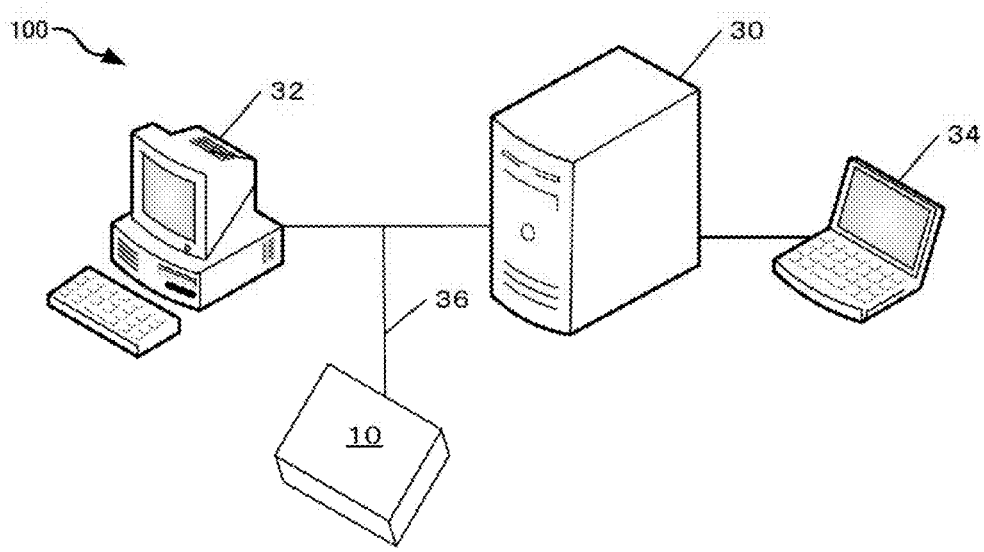
FIG. 1 is a diagram showing an example of a configuration for a file system according to one embodiment.

As mentioned above, increasing the storage capacity of buffers has been considered as a way of presenting interruptions in the accumulation of data in buffers. However, regularly releasing a large amount of storage capacity for the LTFS is undesirable as the LTFS then monopolizes the resources of the host using the LTFS. Because LTFS is reconciled with other applications, its use of buffer capacity should be minimized in order to avoid data writing delays caused by wrap turns.

Therefore, it is desirable that various embodiments herein provide a data writing method able to prevent and/or reduce data writing delays at wrap turns when writing data to a tape drive in a file system without the use of a large-capacity or dedicated buffer.

Provided herein are embodiments for writing data to a tape in a tape drive while data successively accumulated in the buffer of a file system is transferred to the tape drive. This method includes the steps of detecting a wrap turn when data is being written to the tape (Step S13); allocating buffer space including a storage capacity exceeding the amount of data to be stored in the buffer during the wrap turn (Step S14); successively accumulating write data in the buffer space instead of the buffer during the wrap turn (Step S15); resuming the accumulation of write data in the buffer after the wrap turn has been completed (Step S11); and releasing the buffer space after the write data accumulated in the buffer space has been transferred to the tape drive (Step S19).

A method for writing data to a tape in a tape drive while data successively accumulated in the buffer of a file system is transferred to the tape drive according to one general embodiment includes the steps of: detecting a wrap turn when data is being written to the tape, allocating buffer space including a storage capacity exceeding the amount of data to be stored in the buffer during the wrap turn, successively accumulating write data in the buffer space instead of the buffer during the wrap turn, resuming the accumulation of write data in the buffer after the wrap turn has been completed, and releasing the buffer space after the write data accumulated in the buffer space has been transferred to the tape drive.

A computer program product for writing data to a tape in a tape drive while data successively accumulated in the buffer of a file system is transferred to the tape drive according to another general embodiment includes a computer readable storage medium having program instructions embodied therewith, the program instructions readable and/or executable by a device to cause the device to perform a method which includes detecting a wrap turn when data is being written to the tape, allocating buffer space including a storage capacity exceeding the amount of data to be stored in the buffer during the wrap turn, successively accumulating write data in the buffer space instead of the buffer during the wrap turn, resuming the accumulation of write data in the buffer after the wrap turn has been completed, and releasing the buffer space after the write data accumulated in the buffer space has been transferred to the tape drive.

A system for writing data to a tape in a tape drive while data successively accumulated in the buffer of a file system is transferred to the tape drive according to yet another general embodiment includes a processor and logic integrated with and/or executable by the processor, the logic being configured to: detect a wrap turn when data is being written to the tape, allocate buffer space including a storage capacity exceeding the amount of data to be stored in the buffer during the wrap turn, successively accumulate write data in the buffer space instead of the buffer during the wrap turn, resume the accumulation of write data in the buffer after the wrap turn has been completed, and release the buffer space after the write data accumulated in the buffer space has been transferred to the tape drive.

The following is an explanation of an embodiment with reference to the drawings. FIG. 1 is a diagram showing an example of a configuration for a file system according to one embodiment. The file system 100 includes a tape drive 10, a host (server) 30, and PCs (terminals) 32 and 34, which are able to communicate with each other via a network 36. Only one tape drive 10 and host (server) 30 are depicted in FIG. 1, but this is merely an example. A file system can include two or more tape drives 10 and hosts (servers) 30.

The file system 100 can be a Linear Tape File System (LTFS). In LTFS, files stored on a tape cartridge can be accessed directly in the same manner as any other removable storage medium such as an HDD, USB memory or CD-R, as long as the tape cartridge has been inserted into a tape drive. In order to create a file system using a tape drive, the tape drive may include a partitioning function. In the LTO-5 standards, a tape is divided into two partitions.

Figure 2:
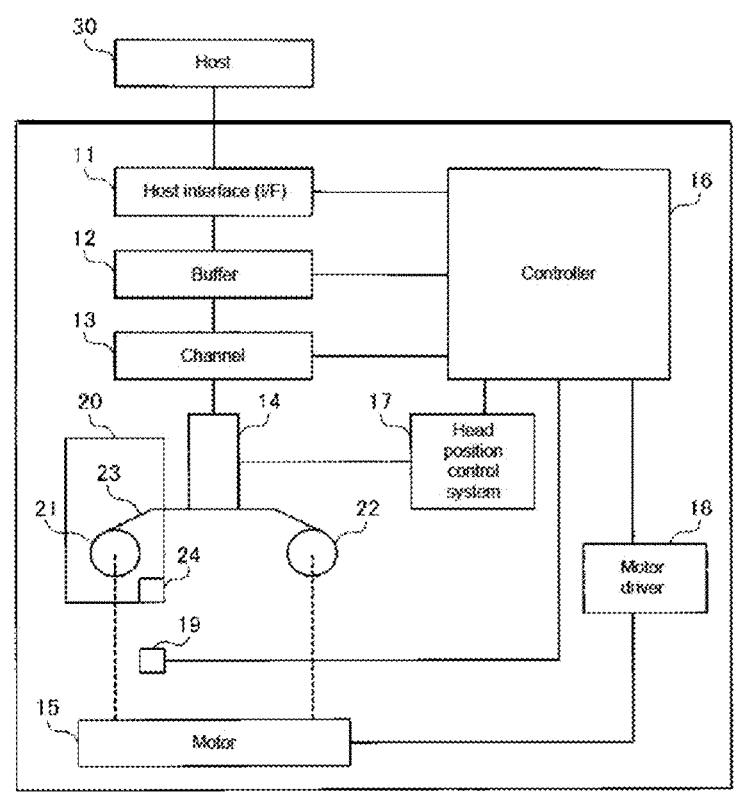
FIG. 2 is a diagram showing an example of a tape drive configuration according to one embodiment.

FIG. 2 is a diagram showing an example of a configuration for a tape drive according to one embodiment. The tape drive 10 includes a host interface (referred to below as the "host I/F") 11, a buffer 12, a channel 13, a head 14, and a motor 15. It also includes a controller 16, a head position control system 17, and a motor driver 18. Because a tape cartridge 20 can be inserted and loaded into the tape chive 10, a tape cartridge 20 is also depicted here. The tape cartridge 20 includes tape 23 wound around reels 21 and 22. The tape 23 moves longitudinally towards reel 22 from reel 21 or from reel 22 to reel 21 as reels 21 and 22 rotate. In this example, the tape 23 is magnetic tape, but may be any tape medium other than magnetic tape.

The tape cartridge 20 also includes cartridge memory (CM) 24. Information such as the type of data written to the tape 23 is recorded in the CM 24. High-speed access to the data can be realized by performing non-contact adjustment on the index of the data written to the tape and the usage conditions for the tape 23 using, for example, an RF interface. In FIG. 2, the interface used to access the CM 24 such as an RF interface is indicated as the cartridge memory interface (referred to below as the "CM I/F") 19.

Here, the host I/F 11 communicates with the host (server) 30 and the other PC 32. Commands for writing data to the tape 23, commands for moving the tape 23 to a specific position, and commands for reading data front the tape 23 are acquired, for example, from operating system (OS) of the host 30. In the example of an LTFS described above, data in the tape drive can be referenced directly by the desktop OS, and files can be executed by double clicking and copied by dragging, and dropping in the same manner as files on a hard drive (HD).

The buffer 12 is memory used to hold data to be written to the tape 23 and data read from the tape 23. This memory can be composed of DRAM. The buffer 12 has a plurality of buffer segments, and each buffer segment stores a data set which is a unit of data written to or read from the tape 23.

The channel 13 is a communication path used to send data to be written to the tape 23 to the head 14, and data read from the tape 23 from the head 14. As the tape 23 moves longitudinally, the head 14 writes information to the tape 23 and reads information from the tape 23. The motor 15 rotates reel 21 and 22. In FIG. 2, the motor 15 is denoted by a single square, but two motors 15 are preferably installed, one each for reel 21 and reel 22.

The controller 16 controls the entire tape drive 10. For example, the writing of data to the tape 23 and the reading of data from the tape 23 is controlled in accordance with commands received by the host I/F 11. It also controls the head position control system 17 and the motor driver 18. The head position control system 17 is a system for tracking, the desired wrap. Here, a wrap is a group of tracks on the tape 23. Because the head 14 is also desirably switched electronically when the wrap has to be switched, switching control is performed by the head position control system 17. Wraps and wrap switching are explained in greater detail below.

The motor driver 18 drives the motor 15. When two motors 15 are used as mentioned above, two motor drivers 18 are also provided. The CM I/F 19 is realized by an RF reader/writer which writes information to the CM 24 and reads information from the CM 24.

Figure 3A:
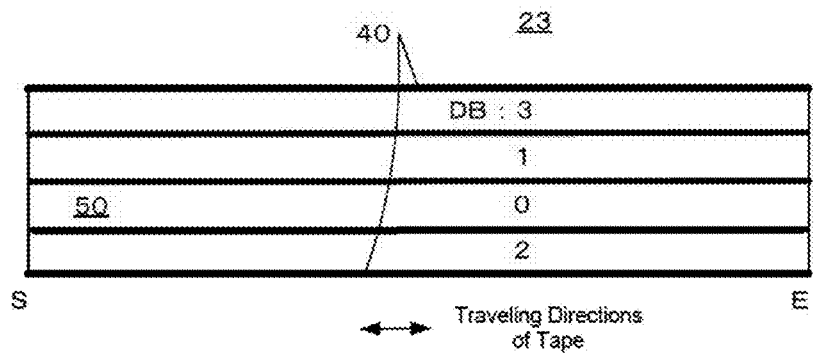
FIGS. 3A-3B are diagrams showing an example of a tape configuration according to one embodiment.
Figure 3B:
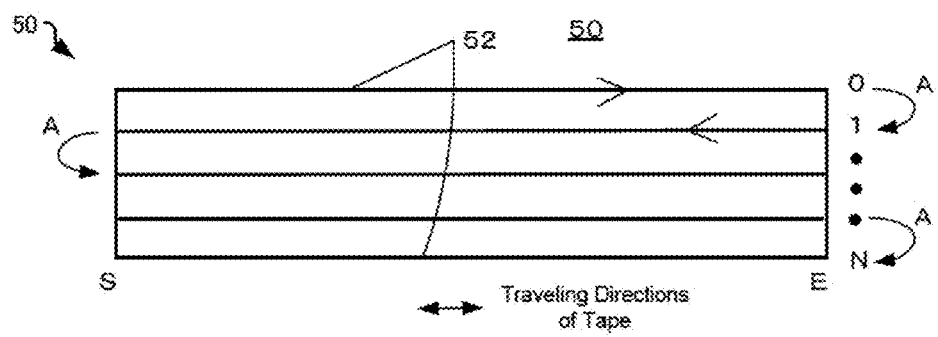

FIGS. 3A-3B are diagrams showing an example of a configuration for the tape 23 in the tape cartridge 20 according to one embodiment. FIG. 3A is an example of tape 23 that is compatible with LTO-5. In FIG. 3A, the recording surface on tape with a width of 12.65 mm has five servo bands 40 arranged so as to interpose four data bands DB 0-3. For example, in LTO-5, each data band has 320 data tracks (not shown) for a total of 1280 data tracks. Each servo band 40 has a pre-recorded servo pattern for properly guiding (tracking) the head 14. In the tape drive 10, the head 14 is positioned with great precision while reading the servo patterns on the two servo bands 40 on either side of the data bands DB 0-3 in order to read and write data.

FIG. 3B is a diagram showing the wraps 52 included in a single data band 50 (DB 0-2) from FIG. 3A. As mentioned above, a wrap 52 is a group of tracks on the tape 23. In other words, in a situation where the head 14 writes a large amount of data to the tape 23, a wrap is the data group on one pass when several passes are made over the tape 23 in the longitudinal direction. For example, in LTO-5, there are 20 wraps on a single data band 50, and 80 wraps on the entire tape. When data is being written to the tape and the head comes to the end of one wrap, the traveling direction of the tape is reversed, and the head position control system 17 moves to the adjacent wrap (arrow A) and continues to write data. Switching wraps is referred to as a "wrap turn", and a wrap turn is usually performed in several seconds. Data is typically not written to a wrap while a wrap turn is being performed.

Figure 4:
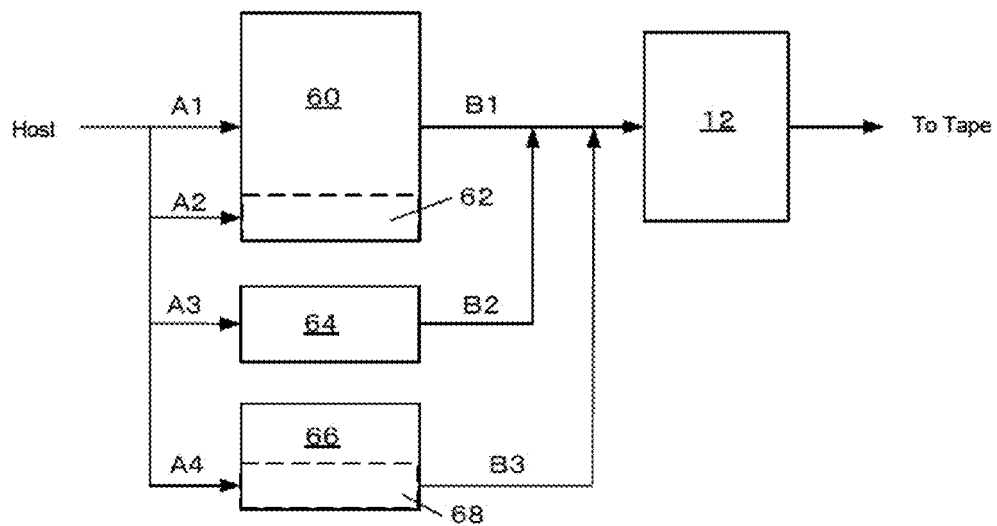
FIG. 4 is a diagram for explaining the accumulation of data in a buffer according to one embodiment.

FIG. 4 is a diagram used to explain the accumulation of data in a buffer according to one embodiment. In the present embodiment, buffers 60, 64 and 66 are buffers arranged in either the host 32 or file system 100, and buffer 12 is the buffer inside the example of the tape drive 10 explained above and depicted in FIG. 2. Buffer 60 is the buffer ordinarily used to read and write data, and buffers 64 and 66 are buffers that may be allocated and used by the present embodiment during a wrap turn. Semiconductor memory such as DRAM or an HDD may be used as buffers 64 and 66. Buffers 64 and 66 can be provided in the disk drive 10. In this case, data is transferred directly from the host to the buffer.

In order to continuously write data to the tape drive 10 when the file system 100 is an LTFS, a so-called delayed write function is provided to write data to the tape as data that has accumulated in the buffer 60 is successively transferred to the buffer 12 in the tape drive. When delayed writing is performed, the data from the host that has accumulated in buffer 60 is transferred to buffer 12 (B1), and the data is written as continuous data to a wrap 520 of the tape. During a wrap turn, buffer 60 or buffer 12 may run out of free space and data can no longer be transferred from the host (A1). In this case, dedicated buffer space is allocated for the wrap turn.

Buffer space may be allocated in the following three ways. First, a specific area 62 of the buffer 60 is allocated as dedicated buffer space for a wrap turn so that other devices and applications do not use the space. Second, a buffer 64 other than buffer 60 is allocated and/or used as dedicated buffer space for a wrap turn. In this case, the data transferred from the host during the wrap turn accumulates in the buffer 64, and is successively transferred to the buffer 12 in the tape drive 10 (B2). Third, a buffer area 68 in a buffer 66 other than buffer 60 is allocated and/or used as dedicated buffer space for a wrap turn. In this case, the data transferred from the host during a wrap turn accumulates in a specific buffer area 68 of the buffer 66, and is successively transferred to the buffer 12 in the tape drive 10 (B3).

The storage capacity of the buffer space is established as equal to or greater than capacity A·T (MB), which is obtained by multiplying the time T (s) of the wrap turn by the transfer rate A (MB/s) from the host. For example, when the transfer rate A is 160 MB/s and the time to perform a wrap turn is 3 seconds, the buffer capacity is desirably at least 480 MB. When the wrap turn has been completed and all of the data in the buffer space has been transferred to buffer 12, the dedicated buffer space for the wrap turn is released so that other devices and applications can use the space. By allocating the desired buffer space when a wrap turn is performed and then releasing the buffer space, the present embodiment may be able to dynamically change the buffer capacity and reliably prevent delays in accumulating data in the buffer. Moreover, the desired buffer capacity can be flexibly and appropriately allocated in accordance with the transfer rate (A) of the write data to the buffer.

In other approaches, the amount of data to be accumulated in the buffer is obtained as the product (A·T) of the transfer rate (A) of the write data to the buffer and the time (T) of the wrap turn.

Figure 5:
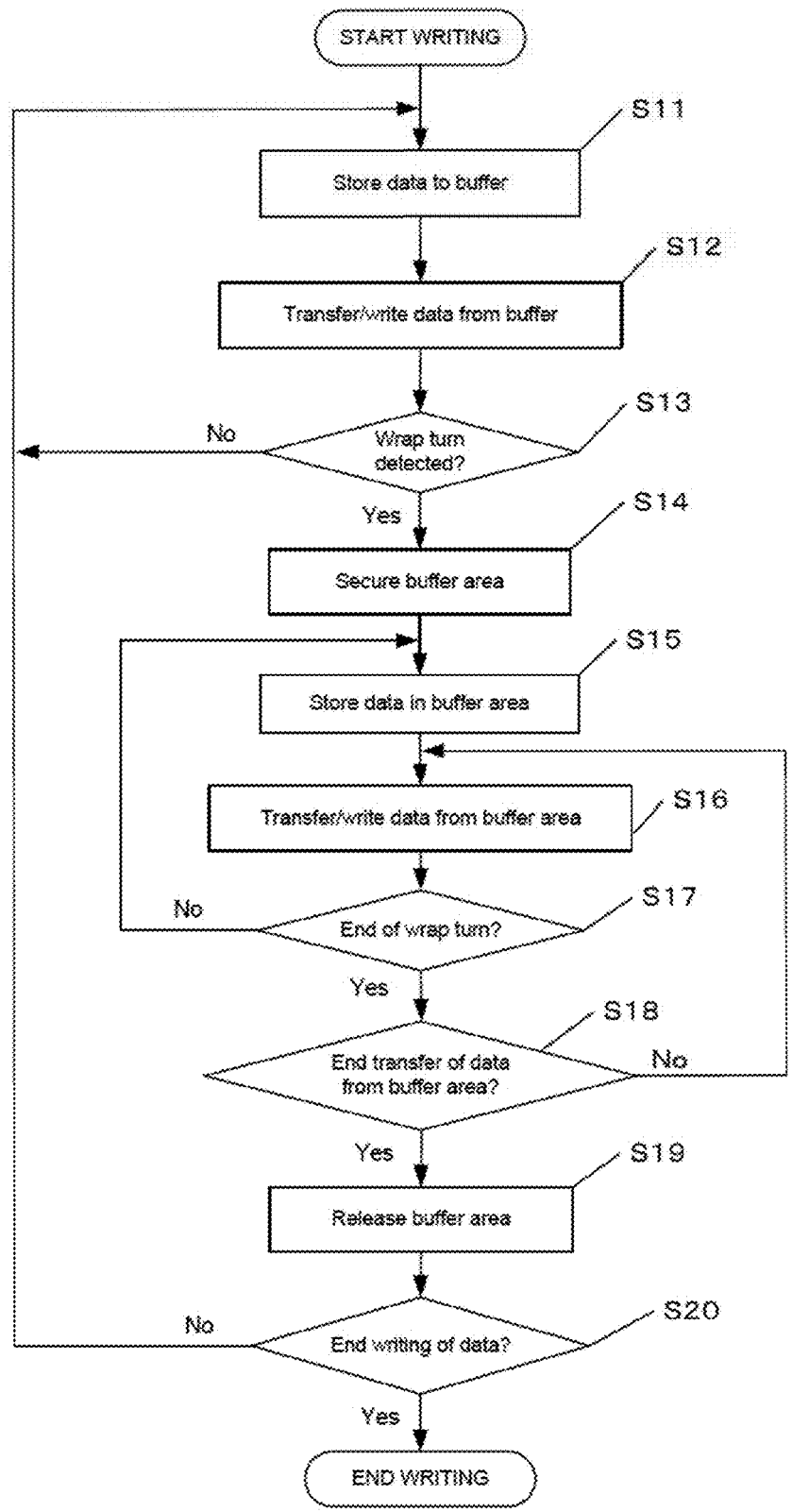
FIG. 5 is a diagram showing the flow of a data writing method according to one embodiment.

With reference to FIG. 5, the following is an explanation of the flow in the data writing method according to one embodiment. The flow in FIG. 5 is realized in the configuration shown in FIG. 1 by (LTFS) software executed by the host (server) 30 or a PC 32.

In Step S11, write data from the host is transferred and accumulates in buffer 60. The write data (file) is successively transferred and accumulated in a predetermined size (for example, 512 KB). In Step S12, the write data that has accumulated in buffer 60 is transferred to buffer 12 in the tape drive 10 and successively written to a wrap 52 on the tape 23.

In Step S13, a wrap turn is detected. The step of detecting a wrap turn may include detecting the approach of a wrap turn as the amount of free space in a wrap falls below a predetermined percentage. When the percentage of writable free space in a wrap reaches a predetermined percentage of the wrap such as 1% or 0.5%, a wrap turn is detected. Alternatively, a wrap turn may be detected by periodically sending a dedicated SCSI command from the host to the tape drive 10 and acquiring wrap position information from the head position control system 17.

When a wrap turn has been detected, buffer space is allocated in Step S14. This buffer space is allocated in the manner described above with reference to FIG. 4. Buffer space 62, 64 or 66 (68) depicted in the drawing is allocated. Thus, the buffer space for writing data during a wrap turn is allocated when the wrap turn is detected, and the buffer space may be released afterwards. Moreover, by dynamically changing the capacity of the buffer desired to accumulate write data, write data delays due to wrap rums can be avoided and/or reduced.

In Step S15, the write data is accumulated in the allocated buffer space during the wrap turn. In the example shown in FIG. 4, this corresponds to data transfers (accumulations) A2-A4 to buffer space 62, 64 or 66 (68). Thus, the allocated buffer space may be a portion of the buffer, another buffer, or a portion of another buffer. Because any buffer available in the file system can be selected, used and allocated, buffer capacity can be dynamically changed and allocated with even greater flexibility.

In Step S16, the data is transferred from buffer space 62, 64 or 66 (68) to buffer 12 in the tape drive 10, and is written as continuous data to a wrap 52 on the tape 23.

In Step S17, it is determined whether the wrap turn has ended. When the determination is No, Steps S15 and S16 are repeated. When the wrap turn has ended, it is determined in Step S18 whether or not all of the data that had accumulated in the buffer space has been transferred to the buffer 12 in the tape drive 10. When the determination is No, the process returns to Step S16, and priority is given to transferring data from the buffer space until the transfer of data from the buffer space has been completed. Afterwards, the buffer space can be reliably released. When the determination in Step S18 is Yes, the buffer space allocated in Step S19 is released. Next, in Step S20, it is determined whether or not the transfer of write data from the host has been completed. Steps S11 through S19 described above are repeated until the determination is Yes. Thus, because wrap turns can be predicted and/or detected in advance, buffer space can be reliably allocated for write data that accumulates during wrap turns, and interruptions can be avoided while writing data to the buffer.

Embodiments of the present invention were explained above with reference to the drawings. The present invention, however, is not restricted to these embodiments. For example, in the explanation of the embodiments, the tape drives were primarily LTFS and LTO-5 compatible. However, the present invention is not restricted to this, and is applicable to data writing to all tape drives using a delayed write function that accumulates data in a buffer. Moreover, the present invention can be embodied using additional improvements, modifications and variations based on the knowledge of those skilled in the art without departing from the spirit or scope of the present invention.

Furthermore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special propose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

What is claimed is:

1. A method for writing data to a tape in a tape drive while data successively accumulated in a buffer area of a buffer of a file system is transferred to the tape drive, the method comprising:

detecting a wrap turn when data is being written to the tape;
   allocating buffer space including a storage capacity exceeding the amount of data to be stored in the buffer area during the wrap turn;
   successively accumulating write data in the buffer space instead of the buffer area during the wrap turn;
   resuming the accumulation of write data in the buffer area after the wrap turn has been completed; and
   releasing the buffer space after the write data accumulated in the buffer space has been transferred to the tape drive.

2. The method as recited in claim 1, wherein the detecting the wrap turn includes detecting the approach of the wrap turn as the amount of free space in a wrap falls below a predetermined percentage.

3. The method as recited in claim 1, wherein the allocated buffer space is a portion of the buffer, another buffer, or a portion of another buffer.

4. The method as recited in claim 1, wherein the amount of data to be accumulated in the buffer area is obtained as the product (A·T) of the transfer rate (A) of the write data to the buffer and the time (T) of the wrap turn.

5. The method as recited in claim 1, wherein the file system is a linear tape file system.

6. A computer program product for writing data to a tape in a tape drive while data successively accumulated in a buffer area of a buffer of a file system is transferred to the tape drive, the computer program product comprising a computer readable storage medium having program instructions embodied therewith, the program instructions executable by a device to cause the device to perform a method comprising:

detecting, by the device, a wrap turn when data is being written to the tape;
   allocating, by the device, buffer space including a storage capacity exceeding the amount of data to be stored in the buffer area during the wrap turn;
   successively accumulating write data in the buffer space instead of the buffer area during the wrap turn;
   resuming the accumulation of write data in the buffer area after the wrap turn has been completed; and
   releasing, by the device, the buffer space after the write data accumulated in the buffer space has been transferred to the tape drive.

7. The computer program product as recited in claim 6, wherein the detecting the wrap turn includes detecting the approach of a wrap turn as the amount of free space in a wrap falls below a predetermined percentage.

8. The computer program product as recited in claim 6, wherein the allocated buffer space is portion of the buffer, another buffer, or a portion of another buffer.

9. The computer program product as recited in claim 6, wherein the amount of data to be accumulated in the buffer area is obtained as the product (A·T) of the transfer rate (A) of the write data to the buffer and the time (T) of the wrap turn.

10. The computer program product as recited in claim 6, wherein the file system is a linear tape file system.

11. A system, comprising:

a processor and logic integrated with and/or executable by the processor, the logic being configured to:
   detect a wrap turn when data is being written to a tape;
   allocate buffer space including a storage capacity exceeding the amount of data to be stored in a buffer area of a buffer during the wrap turn;
   successively accumulate write data in the buffer space instead of the buffer area during the wrap turn;
   resume the accumulation of write data in the buffer area after the wrap turn has been completed; and
   release the buffer space after the write data accumulated in the buffer space has been transferred to a tape drive.

12. The system as recited in claim 11, wherein the detecting the wrap turn includes detecting the approach of a wrap turn as the amount of free space in a wrap falls below a predetermined percentage.

13. The system as recited in claim 11, wherein the allocated buffer space is a portion of the buffer, another buffer, or a portion of another buffer.

14. The system as recited in claim 11, wherein the amount of data to be accumulated in the buffer area is obtained as the product (A·T) of the transfer rate (A) of the write data to the buffer and the time (T) of the wrap turn.

15. The system as recited in claim 11, wherein the file system is a linear tape file system.

* * * * *